United States Patent
Srinivasan et al.

(10) Patent No.: US 12,234,740 B2
(45) Date of Patent: Feb. 25, 2025

(54) TRAINING OF MACHINE LEARNING MODELS FOR DATA-DRIVEN DECISION-MAKING

(71) Applicant: ROLLS-ROYCE DEUTSCHLAND LTD & CO KG, Blankenfelde-Mahlow (DE)

(72) Inventors: Shankar Deepak Srinivasan, Berlin (DE); Klaus Paul, Berlin (DE); Shri Nishanth Rajendran, Berlin (DE); Astrid Walle, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 300 days.

(21) Appl. No.: 17/761,484

(22) PCT Filed: Sep. 23, 2020

(86) PCT No.: PCT/EP2020/076504
§ 371 (c)(1),
(2) Date: Mar. 17, 2022

(87) PCT Pub. No.: WO2021/058526
PCT Pub. Date: Apr. 1, 2021

(65) Prior Publication Data
US 2022/0364478 A1    Nov. 17, 2022

(30) Foreign Application Priority Data
Sep. 25, 2019    (DE) ..................... 10 2019 214 653.8

(51) Int. Cl.
*F01D 21/00*    (2006.01)
*G06N 20/00*    (2019.01)

(52) U.S. Cl.
CPC ........ *F01D 21/003* (2013.01); *F05D 2220/32* (2013.01); *F05D 2260/80* (2013.01); *G06N 20/00* (2019.01)

(58) Field of Classification Search
CPC .............. F01D 21/003; F05D 2220/32; F05D 2260/80; G06N 20/00; G05B 23/0283
See application file for complete search history.

(56) References Cited

U.S. PATENT DOCUMENTS

| 7,152,051 B1 | 12/2006 | Commons et al. |
| 7,384,267 B1* | 6/2008 | Franks ................... G16H 40/40 434/219 |

(Continued)

OTHER PUBLICATIONS

German Search Report dated Aug. 17, 2020 from counterpart German Patent Application No. 10 2019 214 653.8.

(Continued)

*Primary Examiner* — Francis C Gray
(74) *Attorney, Agent, or Firm* — SHUTTLEWORTH & INGERSOLL, PLC; Timothy J. Klima

(57) ABSTRACT

The invention relates to a method for training machine learning models, having the steps of: detecting data in the form of time series data using one or more computers, said data being obtained by means of one or more measuring devices (60-62), in each case in the form of a sensor for measuring a physical variable; receiving multiple classification data units relating to the data using the one or more computers; receiving a selected part of the data using the one or more computers for each of the classification data units; and training multiple machine learning models using the one or more computers, in each case on the basis of at least one of the classification data units and the at least one corresponding selected part of the data, wherein the multiple machine learning models represent multiple instances of the same machine learning model.

17 Claims, 11 Drawing Sheets

(56) References Cited

U.S. PATENT DOCUMENTS

| | | | |
|---|---|---|---|
| 2015/0178265 A1* | 6/2015 | Anderson | H04N 21/44226 704/9 |
| 2016/0267380 A1* | 9/2016 | Gemello | G06N 3/084 |
| 2018/0165384 A1* | 6/2018 | Gandhi | G05B 23/0254 |
| 2019/0118443 A1* | 4/2019 | Asaoka | G05B 23/024 |
| 2019/0286075 A1 | 9/2019 | Yennie et al. | |
| 2021/0018902 A1* | 1/2021 | Yennie | G05B 19/4188 |
| 2021/0279644 A1 | 9/2021 | Givental et al. | |
| 2022/0197306 A1* | 6/2022 | Cella | G06N 20/10 |

OTHER PUBLICATIONS

International Search Report and Written Opinion dated Jan. 15, 2021 from counterpart International Patent Application No. PCT/EP2020/076504.

Li, Zhixiong; Goebel, Kai; Wu, Dazhong: Degradation modeling and remaining useful life prediction of aircraft engines using ensemble learning; Model Training Journal of Engineering for Gas Turbines and Power, vol. 141, "Case Study"; Apr. 2019, vol. No. 4, Article No. 041008; ISSN 0742-4795 https://doi.org/10.1115/1.40416 74 http://pdfs.semanticscholar.org/ 3a64/75635b55dc23328d215b8 d034d5381374ceb.pd.

European Office Action dated Aug. 10, 2023 from counterpart European Patent Application No. 20776157.8.

* cited by examiner

TRAINING OF MACHINE LEARNING MODELS FOR DATA-DRIVEN DECISION-MAKING

This application is the National Phase of International Application PCT/EP2020/076504 filed Sep. 23, 2020 which designated the U.S.

This application claims priority to German Patent Application No. 102019214653.8 filed Sep. 25, 2019, which application is incorporated by reference herein.

The present disclosure relates in particular to a method and system for training machine learning models, to a computer program product and to a machine learning model.

Currently, people often classify specific data for decision-making, e.g. in order to identify faulty components and components that need to be replaced or when regularly evaluating key figures. However, such decision-making generally takes up a lot of time, and data-driven decision-making within short response times is needed in some applications. Furthermore, special analysis tools can be developed for a system to be monitored, but this is usually very complex and typically has to be adapted in a roundabout way when there is a change to the monitored system. It is possible to train an artificial intelligence, AI, with data and a classification of these data, e.g. by providing multiple photographs that each contain a bicycle and the statement "bicycle", and further photographs with no bicycle and the statement "no bicycle". However, the learning process of such an AI is typically lengthy, because e.g. in many cases several thousand datasets are used, and the AI is often error-prone, which limits the possible areas of application.

The object of the present invention is to allow improved, automated, data-driven decision-making.

According to one aspect, a method for training machine learning models for data-based decision-making is provided. The method comprises capture of data, namely capture of measurement data. The data, that is to say measurement data, are captured by one or more computers and obtained (either as part of the method or beforehand) by means of a measuring device or multiple measuring devices. The measuring device(s) is/are (each) in the form of a sensor for measuring a physical quantity. The data comprise e.g. multiple values recorded by one or more measuring devices and/or statements relating to maintenance processes or states. The data are captured in the form of time series data. The one or more computers receives/receive multiple classification data units relating to the data, in particular measurement data. Each of the classification data units comprises a classification of the data. The classification relates to the captured data. The method further comprises reception, by the one or more computers, of a selected portion of the data for each classification data unit. The selected portion comprises at most as many values as the captured data. Furthermore, the method comprises training, by means of the one or more computers, of multiple machine learning models, which are multiple instances of the same type of machine learning model, each on the basis of at least one of the classification data units and the at least one respective selected portion of the data (and, optionally, additionally on the basis of the complete data). The different machine learning models (the instances of the same machine learning model) are trained in particular with different classification data units and selected portions.

This is based on the knowledge that, in the case of data that form the basis for decision-making, measured values in specific periods of time allow particularly precise conclusions to be drawn about the state of the measuring device or of a component monitored by the measuring device, wherein multiple different selections and classifications, e.g. made by different users, with regard to the same data can lead to different but in each case potentially meaningful results. In particular if a measuring device of a gas turbine engine or of a piston engine is involved, for example, specific signatures in the data can be an indication of a deteriorating state of the measuring device or of a component that is monitored or monitorable thereby. Since the machine learning models are trained on the basis of the selection of the respective selected portion of the data together with the respective classification data unit, a significantly improved quality of decision-making by means of machine learning models trained in this way is possible, and also a comparison of the different classifications. The trained machine learning models also permit extensive automation. Furthermore, the volume of data required for training the machine learning models can be reduced. This can be advantageous in particular in the case of applications in which by and large only a limited volume of data is available for training that would not be sufficient for commonly trained machine learning models. In addition, it is possible to adapt the method for a variety of different applications, e.g. by capturing only data in relation to the respective decision-making and also the classification data units and selected portions. An adaptation of the machine learning models for different applications beyond the training is not necessary.

By way of example, the classification comprises two or three decision options. For example, a selection is made from two answers (e.g. A or B) or from three answers (e.g. A, B or C) for the classification. The classification corresponds e.g. to the result of a yes/no decision or a decision between the options A (e.g. yes), B (e.g. no) and C (e.g. "unknown" or "undefined"). The classification data units each comprise, by way of example, the statement "yes" or "no" or another indication of positive or negative, e.g. 1 or 0. The data comprise e.g. a multiplicity of discrete values relating to different points in time. Optionally, some or all steps of the method are performed repeatedly, e.g. iteratively. The selected portion of the data can be evaluated to obtain key figures (e.g. a minimum and/or a maximum and/or a standard deviation). Optionally, the machine learning model is trained on the basis of one or more such key figures. The selected portion of the data is optionally enriched with metadata of a user (e.g. a time required for selection) and/or with additional information entered by the user (e.g. a classification and identification of specific features in the captured data). The selected portion of the data forms a dataset.

The machine learning models can e.g. each be used as a digital assistant for data-driven decision-making by means of artificial intelligence.

The measuring device(s) is/are (each) in the form of a sensor for measuring a physical quantity, e.g. for measuring a temperature, a speed, a number of revolutions or a pressure. By way of example, the computer(s) receives/receive multiple temporally successive measured values from a measuring device or multiple measuring devices. Each selected portion of the data corresponds, by way of example, to a time window or multiple time windows that is/are smaller than (at most just as large as) the total period spanned by the captured data. Optionally, multidimensional data (e.g. two-dimensional) are generated from data (in particular in each case in the form of time series data) from multiple measuring devices, the selected portion of the data being selected e.g. from the multidimensional data in each case.

To train the machine learning models, e.g. properties of the respective selected portion of the data are extracted in the form of one or more parameters (e.g. a maximum value, a minimum value, a median, a mean average, a variance or the like), the training being performed on the basis of these parameters. At least one of the parameters can be a statistical parameter.

Each of the machine learning models implements an artificial intelligence and can be used in particular in the form of an assistant to support a user, e.g. a human specialist. Each machine learning model can be or comprise a classification model. In particular, each of the machine learning models can be or comprise an artificial neural network. Furthermore, each of the machine learning models can comprise a supervised learning model, a decision tree model, a random forest model, a support vector machine, a k-nearest neighbor model and/or an XGBoost model, or others. Optionally, data containing continuous variables are processed by means of a regression model.

The method optionally further comprises provision, by means of the one or more computers, of the data on at least one interface, in particular repeatedly, in particular for display to multiple users. In this case, there may be provision for the classification data units received by the one or more computers to relate to the data repeatedly provided on the at least one interface. The interface (or each of multiple interfaces) can be used to classify the data, and the user can be provided with the capability of selecting the selected portion of the data. This can be done, by way of example, by providing additional measuring devices specifically provided for training the respective machine learning model and/or by means of a classification by a human user.

Data from multiple measuring devices can be provided on the interface at the same time. This can improve the quality of the training further.

Optionally, the data indicate measured values from one or more machines, in particular one or more engines, e.g. piston engine(s) (in particular diesel engine(s)), for example from a gas turbine or from multiple gas turbines. In the case of gas turbines in particular, it is often desirable to identify a deteriorating state of a measuring device or of a component monitored by a measuring device as early as possible, which is made possible by the machine learning models trained in this way.

The machine learning models can each be trained by an applicable classification data unit after each provision. This allows a constantly optimized training state. Alternatively, the machine learning models are trained with classification data units relating to different data and associated selected portions of data, e.g. as soon as a predetermined number of classification data units have been provided. This allows efficient training, e.g. with limited computing capacities.

When the data obtained by means of the one or more measuring devices are captured, there may be provision for the data to be selected from a large amount of data (e.g. stored on a data carrier), wherein a comparison with a threshold value and/or a prediction of a further machine learning model is used for the selection. This further machine learning model can be designed to select the data that promise the best possible training of the machine learning model to be trained.

A prediction accuracy can be ascertained for each of the machine learning models, e.g. on the basis of a validation dataset.

The prediction accuracies are optionally displayed on an interface.

One or more of the machine learning models may be selectable (and can be selected) by way of the interface.

A (higher-level) model, in particular machine learning model, is optionally calculated from the multiple machine learning models, e.g. on the basis of parameters from or for the individual machine learning models. The higher-level machine learning model allows a particularly precise classification. The higher-level machine learning model can be calculated e.g. by means of a "bagging" or "ensemble learning" algorithm.

The individual machine learning models (e.g. the parameters thereof) can optionally be weighted with different weighting factors to calculate the higher-level machine learning model.

Optionally, the weighting factors are determined by ascertaining the prediction accuracy for each of the machine learning models on the basis of a validation dataset. The validation dataset comprises e.g. data and classification data. This allows a particularly greatly increased accuracy of the classification by the higher-level machine learning model. Furthermore, so-called overfitting can be avoided by selecting suitable training datasets for the higher-level machine learning model.

According to one aspect, a method for classifying data is provided. The method comprises provision of a higher-level machine learning model that has been created using the method described herein. The method further comprises classification, by one or more computers, of (further) data captured by means of one or more measuring devices, by using the higher-level machine learning model. This classification is possible with a particularly high level of precision.

A result of the classification can be displayed to a user on a display, and at least one input command from the user can be detected.

The method for classifying data may further comprise the following step: generation, by the one or more computers and on the basis of the effected classification of the data, of a dataset that indicates performance of maintenance work. The dataset can be transmitted by way of a communication interface in order to automatically trigger performance of the maintenance work.

According to one aspect, a method for performing maintenance work is provided. The method comprises classification of data according to the method for classifying data that is described above and performance of the maintenance work according to the generated dataset.

According to one aspect, a computer program product is provided, comprising instructions that, when executed by one or more processors, cause the one or more processors to perform the following steps: capture of data obtained by means of one or more measuring devices, wherein the one or more measuring devices is/are (each) in the form of a sensor for measuring a physical quantity and wherein the data are captured in the form of time series data; reception of multiple classification data units relating to the data; reception of a selected portion of the data in relation to each of the classification data units; and training of multiple machine learning models, each on the basis of one of the classification data units and the associated selected portion of the data, wherein the multiple machine learning models are multiple instances of the same (type of) machine learning model.

The or a computer program product can comprise instructions that, when executed by one or more processors, cause the one or more processors to perform the method for training machine learning models and/or the method for classifying data according to any configuration described herein.

According to one aspect, a (higher-level) machine learning model (e.g. an artificial neural network) is provided, created using the method for training machine learning models according to any configuration described herein.

According to one aspect, a nonvolatile storage medium is provided, comprising the computer program product described above and/or the higher-level machine learning model described above.

According to one aspect, a system for training machine learning models is provided, comprising one or more processors and a memory that stores instructions that, when executed by the one or more processors, cause the one or more processors to perform the following steps: capture of data obtained by means of one or more measuring devices, wherein the one or more measuring devices is/are (each) in the form of a sensor for measuring a physical quantity and wherein the data are captured in the form of time series data; reception of multiple classification data units relating to the data; reception of a selected portion of the data for each of the classification data units; and training of multiple machine learning models on the basis of in each case at least one of the classification data units and the associated selected portion of the data, wherein the multiple machine learning models are multiple instances of the same (type of) machine learning model. The memory can store instructions that, when executed by one or more processors, cause the one or more processors to perform the method for training machine learning models and/or the method for classifying data according to any configuration described herein. This can involve in particular the higher-level machine learning model being created.

The system optionally comprises an interface. The interface can comprise a display section for displaying the captured data and/or for receiving a selection of at least one selected portion of the data and/or a classification section for receiving at least one classification data unit.

Optionally, the system comprises at least one gas turbine engine or a piston engine or other machine, the one or more measuring devices being arranged e.g. on that machine (e.g. on the gas turbine engine). There may be provision for the machine (the gas turbine engine) to be moveable relative to the one or more computers. By way of example, the one or more computers is/are (permanently) stationed on the ground.

Embodiments will now be described by way of illustration with reference to the figures, in which.

Figure 1:
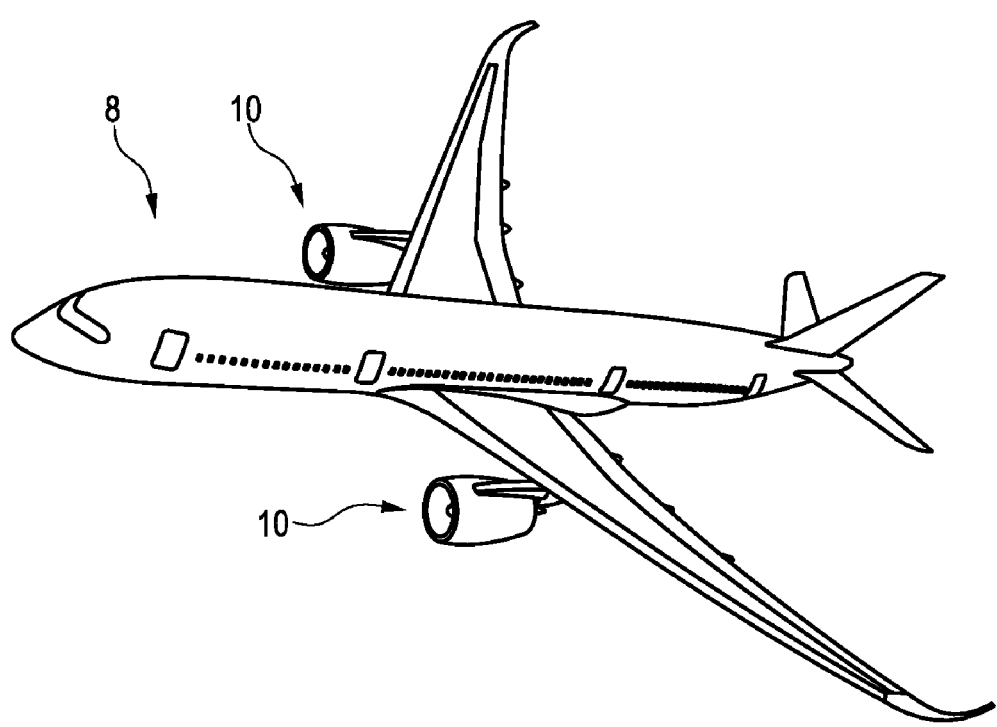
FIG. 1 shows an aircraft in the form of an airplane with multiple gas turbine engines.

FIG. 1 shows an aircraft 8 in the form of an airplane. The aircraft 8 comprises multiple gas turbine engines 10.

Figure 2:
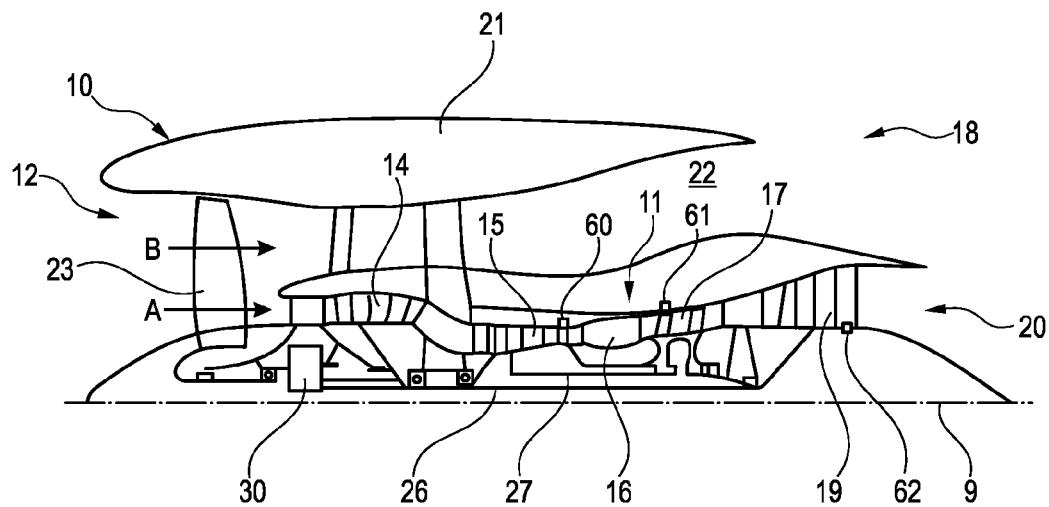
FIG. 2 shows a sectional side view of a gas turbine engine.

FIG. 2 depicts one of the gas turbine engines 10 of the aircraft 8 with a main axis of rotation 9. The gas turbine engine 10 comprises an air inlet 12 and a fan 23 that produces two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is installed on and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the propulsive thrust. The epicyclic planetary gear box 30 is a reduction gear box.

Note that the terms "low-pressure turbine" and "low-pressure compressor" as used herein may be taken to mean the lowest-pressure turbine stage and lowest-pressure compressor stage (i.e. not including the fan 23) respectively, and/or the turbine and compressor stages that are connected together by the connecting shaft 26 with the lowest number of revolutions in the engine (i.e. not including the gearbox output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage, or lowest-pressure compression stage.

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 2 has a split flow nozzle 20, 22, which means that the flow through the bypass duct 22 has its own nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Whilst the described example relates to a turbofan engine, the disclosure may be applied, for example, to any type of gas turbine engine, such as an open-rotor (in which the fan stage is not surrounded by an engine nacelle) or turboprop engine, for example.

The geometry of the gas turbine engine 10, and components thereof, is/are defined by a conventional axis system, comprising an axial direction (which is aligned with the axis of rotation 9), a radial direction (in the bottom-to-top direction in FIG. 2), and a circumferential direction (perpendicular to the view in FIG. 2). The axial, radial and circumferential directions run so as to be mutually perpendicular.

Multiple measuring devices are arranged on the gas turbine engine 10, of which multiple measuring devices 60-62 arranged at different points on the gas turbine engine 10 in the form of sensors, specifically temperature sensors for measuring temperatures, are shown here by way of illustration.

Figure 3:
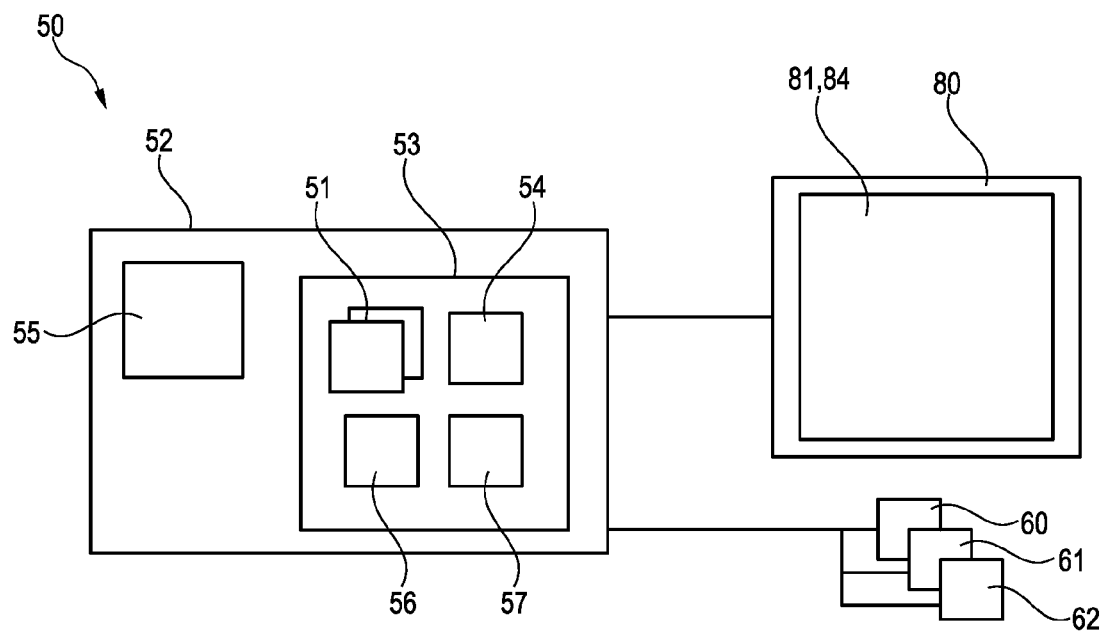
FIG. 3 shows a system for training a machine learning model.

FIG. 3 shows a system 50 with a machine learning model 51, specifically multiple machine learning models 51, which in the present case are multiple instances of the same machine learning model, and for training the machine learning models 51. The system 50 comprises one (optionally multiple) computer 52 with a memory 53. The memory 53 (or a separate memory) stores at least one machine learning model 51, in particular stores or can store the multiple machine learning models 51. The computer 52 is communicatively coupled to the measuring devices 60-62 in order to capture data, specifically measurement data, therefrom. Alternatively or additionally, the computer 52 is communicatively coupled to at least one input means in order to receive maintenance data and/or state data therefrom. These maintenance and/or state data can be entered e.g. by a user using the input means. For the sake of simplicity, reference is always made to measurement data below, but in each case this can alternatively or additionally also be maintenance and/or state data, in general data.

The machine learning models 51 are designed for machine learning and in the present example comprise a random forest and/or an artificial neural network.

The memory 53 stores instructions 54 that, when executed by a processor 55 (or multiple processors) of the computer 52, cause the processor 55 (or the multiple processors) to perform the following steps:

capture of measurement data obtained by means of one or more measuring devices 60-62 of the system 50 (e.g. via an engine control unit);

reception of multiple classification data units relating to the measurement data;

reception, in relation to one of the classification data units in each case, of a portion of the measurement data that is in particular selected by a human operator; and training of each machine learning model 51 (in particular each instance) on the basis of at least one classification data unit and the respectively associated selected portion of the measurement data.

The system 50 also comprises further machine learning models 56 and 57, which are explained in more detail below. In addition, the system 50 comprises interfaces 81, 84, which in the present example are in the form of graphical user interfaces (GUI) and can be displayed on a display 80, e.g. in the form of a display. The interfaces 81, 84 are also explained in more detail below.

Based on the trained machine learning models 51, further measurement data can then be classified in order to make data-driven decisions, e.g. to trigger maintenance work. The different training can lead to different results.

Figure 12:
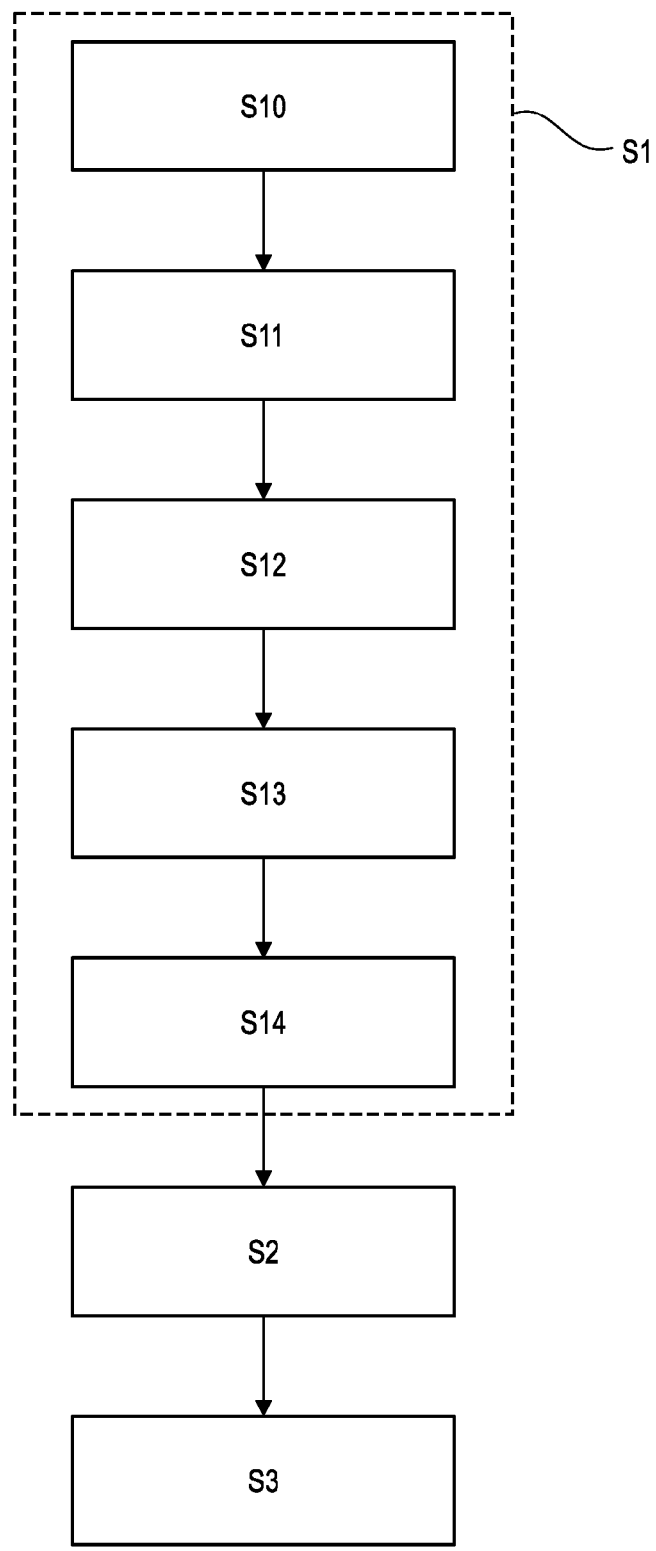
FIG. 12 shows a method for training a machine learning model.

The instructions 54 are part of a computer program product that causes the processor 55 to perform the method shown in FIG. 12. The memory 53 is e.g. a nonvolatile memory.

The processor 55 comprises e.g. a CPU, a GPU and/or a tensor processor.

The computer 52 is stationed on the ground and the gas turbine engine 10 is movable relative thereto.

Figure 4:
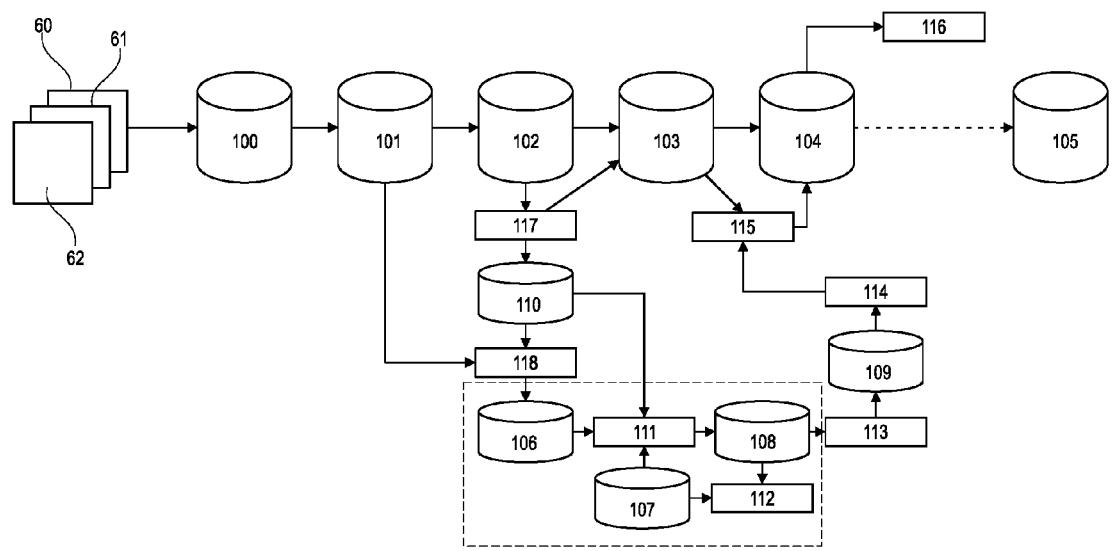
FIG. 4 shows details of the system according to FIG. 3.

FIG. 4 shows further details of the system 50.

The database 100 stores measurement data from the measuring devices 60-62 in the form of a multiplicity of time series and as raw data. The time series originate e.g. from multiple flights of the gas turbine engine 10, from the multiple gas turbine engines 10 of the aircraft 8 and/or from gas turbine engines 10 of multiple aircraft 8 (or, more generally, from multiple machines). The transmission from the measuring devices 60-62 to the database 100 takes place e.g. via a data cable or wirelessly, for example by way of GSM or another mobile communication standard.

Optionally, the data stored in the database 100 are pre-processed and stored in a further database 101, which can also involve a transient flow of data. E.g. data that are not of interest may not be transferred in order to simplify further processing.

Optionally, the measurement data are preprocessed further and stored in a further database 102 in order to perform an analysis of the measurement data vis àvis suitable time series. This analysis takes place in block 117. E.g. threshold monitoring can be used, wherein measurement data in a time window around a point where a threshold value is exceeded are selected as a candidate.

In block 117, the machine learning model 56 can be applied, said model selecting suitable candidates each with a time series from a measuring device 60-62 or each with multiple time series (in particular spanning the same period) from several of the measuring devices 60-62 and therefore being referred to as the selection model 56 below. The selection model 56 is e.g. an unsupervised machine learning model, e.g. dbscan, k means clustering or PCA, or a script that extracts data based on specified rules. The selection model 56 stores the selected candidates or pointers thereto in a database 110. The machine learning model 56 can be implemented e.g. by a computer program that makes appropriate comparisons with the measured values, for example. Alternatively or additionally, the computer program implements a physical model with which the measured values are compared.

An import script retrieves these candidates from the database 102 (or the database 101) in block 118 and provides them to a block 111 (optionally via a further database 106).

In block 111, a classification data unit and a selected portion of the measurement data of the respective candidate are captured for all or for some of the candidates. The classification data units indicate a classification of the candidate into one of multiple predefined classes. The classification data units and/or the selected portions of the measurement data are provided e.g. by additional sensors that have been additionally installed on the gas turbine engine 10 in order to generate the candidates, or by a selection by one or more users. This selection is made e.g. by way of the interface 81.

The classification data units and selected portions of the candidates are stored in a database 108 and provided to a block 112. In block 112, one instance of the machine learning model 51 is trained per user on the basis of the classification data units and selected portions of the candidates that were provided by the user. For this purpose, particular properties of the selected portion of the measurement data are extracted in the form of parameters. Optionally, the extracted parameters and/or values calculated therefrom, e.g. ratios of two parameters, are then the input parameters for the training. Examples of such parameters will be explained later on in connection with FIG. 7.

The training can be carried out iteratively, e.g. for each candidate. The trained instance is stored in a database 107. The trained instance is in turn provided to block 111, which means that a (constantly improving) prediction for the classification of the respective next candidate can already be provided during the training.

Multiple instances of the machine learning model 51 are created and trained, the selected portions being able to be classified and selected in block 111 in different ways, e.g. by different users. Instead of or in addition to trained instances of the machine learning model 51, multiple sets of input parameters can also be stored.

The components primarily responsible for training the multiple instances of the machine learning model 51 are highlighted in FIG. 4 by a dashed box and can be embodied as a separately stored software module.

The data stored in the database 108 are provided to a block 113, which can also access the database 107. In block 113, the (optional) higher-level machine learning model 57 is created. The higher-level machine learning model 57 optionally corresponds to the machine learning model 51, but is trained e.g. with the (optionally weighted and/or selected) input parameters from the multiple instances of the machine learning model 51. By way of example, in block 113, an interface 84 (see FIG. 13) in the form of a graphical user interface is produced that shows a user details of the creation of the higher-level machine learning model 57 and/or affords the user options for influencing, for example to make and/or change a selection of those instances of the machine learning model 51 that are used for creating the higher-level machine learning model 57.

When the higher-level machine learning model 57 is created, the available candidates can be divided into a training dataset and a validation dataset. The training dataset is used e.g. to create the higher-level machine learning model 57 (e.g. by using this dataset to train the instances of the machine learning model 51, which are then used to calculate the higher-level machine learning model 57).

As already mentioned, the individual instances of the machine learning model 51 (and/or the input parameters thereof) are optionally weighted with different weighting factors in order to calculate the higher-level machine learning model 57. The weighting factors are determined e.g. by ascertaining a prediction accuracy and/or an error for each of the instances of the machine learning model 51 on the basis of the validation dataset.

A number of incorrect classifications, a number of classifications, a duration of the classifications, an interval of time between individual classifications and/or a number of possible changes in the classifications are optionally used for a weighting.

Alternatively or additionally, the validation dataset is used to calculate a precision of the higher-level machine learning model 57.

According to one variant, in a loop, one dataset of n (e.g. 20) datasets is retained, the instances of the machine learning model 51 are trained for n−1 datasets, the higher-level machine learning model 57 is calculated and the result for the retained dataset is evaluated. This can be performed n times and the accuracy of the higher-level machine learning model 57 can be calculated from the total yield from all n passes.

The higher-level machine learning model 57 and/or the input parameters thereof is/are stored in a database 109 (which is e.g. stored in the memory 53).

In optional block 114, the creation of the higher-level machine learning model 57 is displayed on a user interface.

The database 103 comprises the data of the database 102 to which optional selection or correction scripts have been applied. Alternatively, instead of the databases 102 and 103, there is only provision for the database 102.

In block 115, the higher-level machine learning model 57 is applied to the measurement data in the database 103 (or 102) in order to classify the measurement data. The results of the classification from block 115 are stored in a database 104, optionally also data from the database 103 (or 102).

The analysis model 56 can interchange data with the higher-level machine learning model 57 via the database 103, e.g. in order to remove specific time series data from a classification.

In block 116, data-driven decisions are made, e.g. maintenance work is triggered. By way of example, it was recognized from the classification that one of the measuring devices 60-62 or a component of the gas turbine engine 10 (or in general an apparatus monitored by the system 50) that is monitored by the measuring devices 60-62 has a defect and needs to be replaced. Optionally, a message is produced and transmitted, e.g. by e-mail, indicating a decision.

The data on which the decisions are based are optionally stored in a database 105. The databases 100 to 104 (which may also be logical steps through a flow of data) are optionally part of an engine equipment health management, EHM, of the gas turbine engine 10. The database 105 may e.g. be stationed on the ground. Furthermore, it will be noted that the databases 100, 101, 102, 103, 104 and/or 105 (optionally all databases) may have separate physical memories or alternatively may be databases of a logical architecture, wherein e.g. multiple or all databases have the same physical memory.

Figure 5:
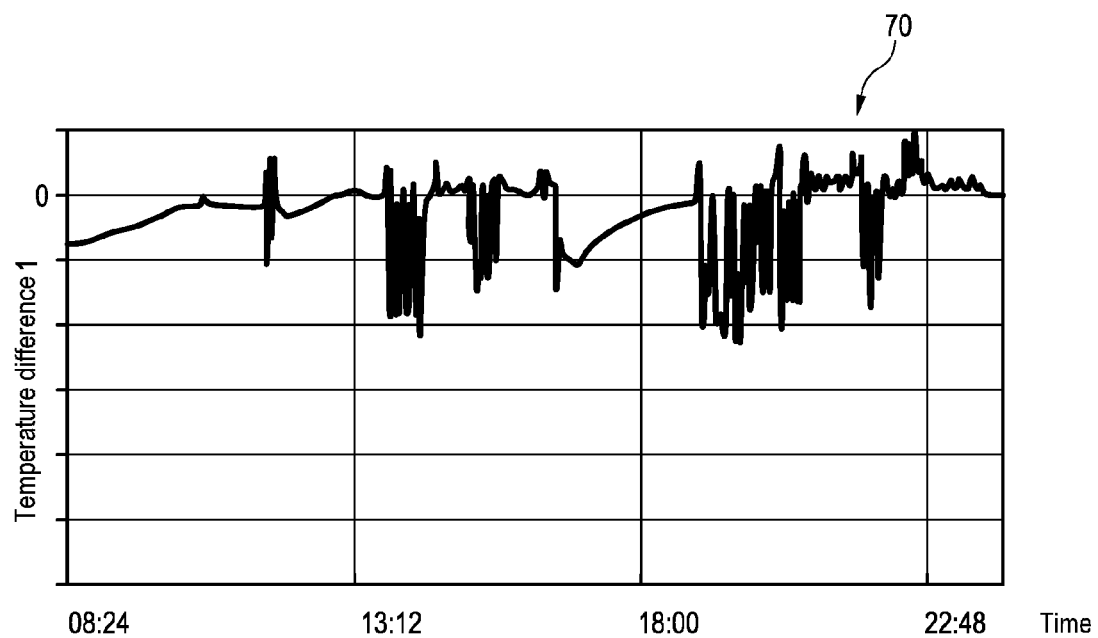
FIGS. 5 to 8 show different examples of measurement data.

FIG. 5 shows illustrative measurement data 70 in the form of time series data. A multiplicity of measured values are plotted against time. Specifically, the measurement data indicate a (first) temperature difference, which can be ascertained, and in this case has been ascertained, using two measuring devices, which are arranged at a distance from one another, of a machine, in the present case a diesel engine (alternatively e.g. analogously by one or two of the measuring devices 60-62), in the form of temperature sensors.

Figure 6:
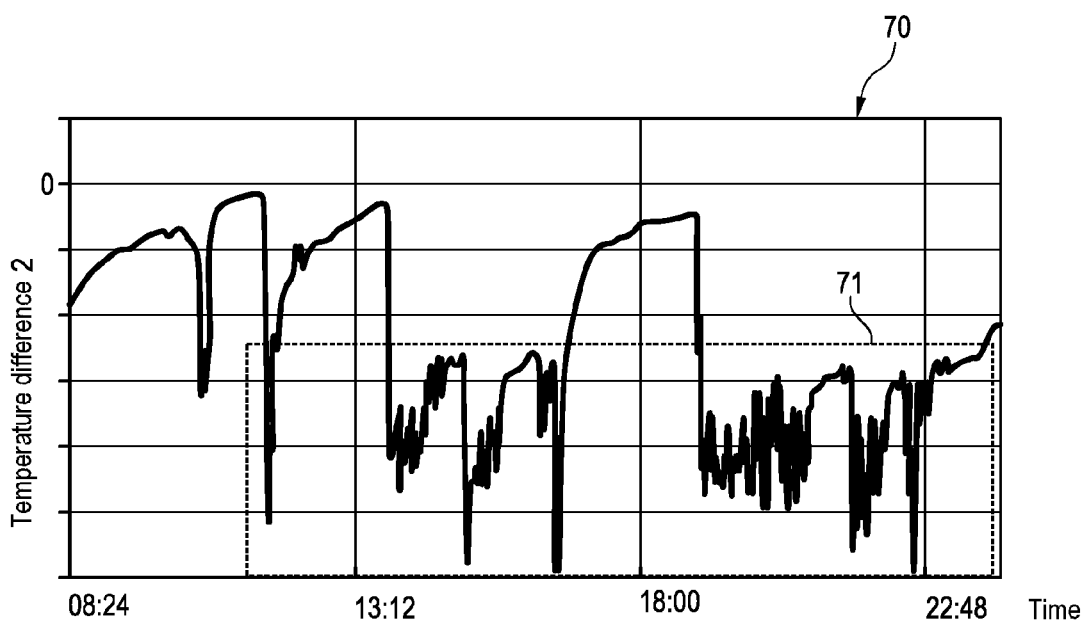

FIG. 6 shows further measurement data 70 in the form of time series data by way of illustration. Here too, a multiplicity of measured values are plotted against time, namely over the same period as the measurement data in FIG. 5. Specifically, the measurement data in FIG. 6 indicate a (second) temperature difference, which can be ascertained, and in this case has been ascertained, using two measuring devices, which are arranged at a distance from one another, of the machine, in the present case of the diesel engine (alternatively e.g. analogously by one or two of the measuring devices 60-62), in the form of temperature sensors, namely a different pair of measuring devices 60-62 than in FIG. 5.

Furthermore, a selected portion 71 of the measurement data 70 is demonstrated in FIG. 6. The selected portion 71 comprises eye-catching ranges of the measurement data. When measurement data are eye-catching is dependent on the respective application. In the present example, values of the temperature difference below a specific limit and sharp fluctuations in the values are eye-catching. The selected portion 71 generally comprises one or more subperiods of time of the measurement data 70 (along the X axis). Optionally, the selected portion 71 also comprises a limitation along the Y axis.

Figure 7:
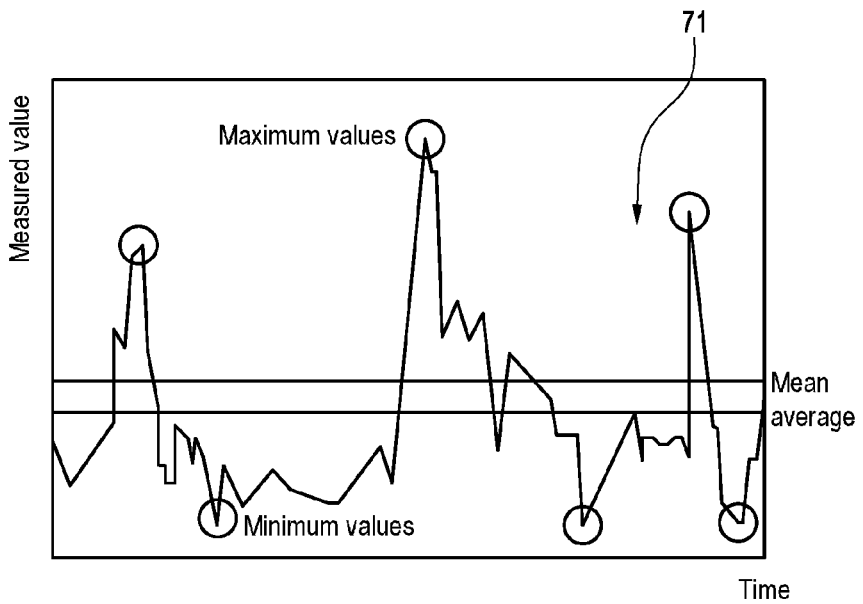

FIG. 7 demonstrates illustrative parameters that can be calculated from an illustrative selected portion 71 of measurement data 70.

The parameters can be e.g. a maximum value, a minimum value, a median, a mean average, a variance, the sum of the squared individual values, the length of the selected portion in the time direction, an autocorrelation or a parameter derived therefrom, the number of values above or below the mean average, the longest time interval above or below the mean average, the sum of the gradient sign changes, a gradient, a standard deviation and/or a number of peaks. Some of these parameters are graphically highlighted in FIG. 7. One or more, e.g. all, of these parameters can be used as input parameters for training the applicable machine learning model 51. Furthermore, ratios of the cited parameters can be formed and used as input parameters for training, e.g. mean average/variance, length/sum of the squared individual values or other ratios.

Figure 8:
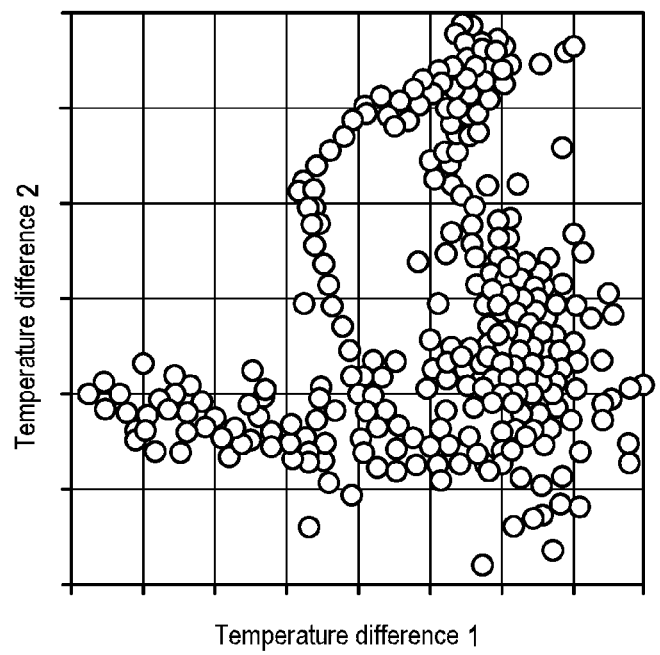

FIG. 8 demonstrates that time series data from multiple measuring devices can optionally be plotted multidimensionally (here two-dimensionally), with the result that the selected portion 71 of the measurement data 70 can be selected multidimensionally. In this case, e.g. multiple correlated measurement data can show particularly clear anomalies, which can then be selected particularly easily and precisely. By way of example, a point in the multidimensional representation corresponds to multiple different measured values at the same point in time.

Optionally, clusters of data points (in particular in the selected portion) are ascertained in the multidimensional representation and e.g. the distances of said clusters from one another and/or the sizes, e.g. radii, of said clusters and/or the number of data points they contain are ascertained.

Figure 9:
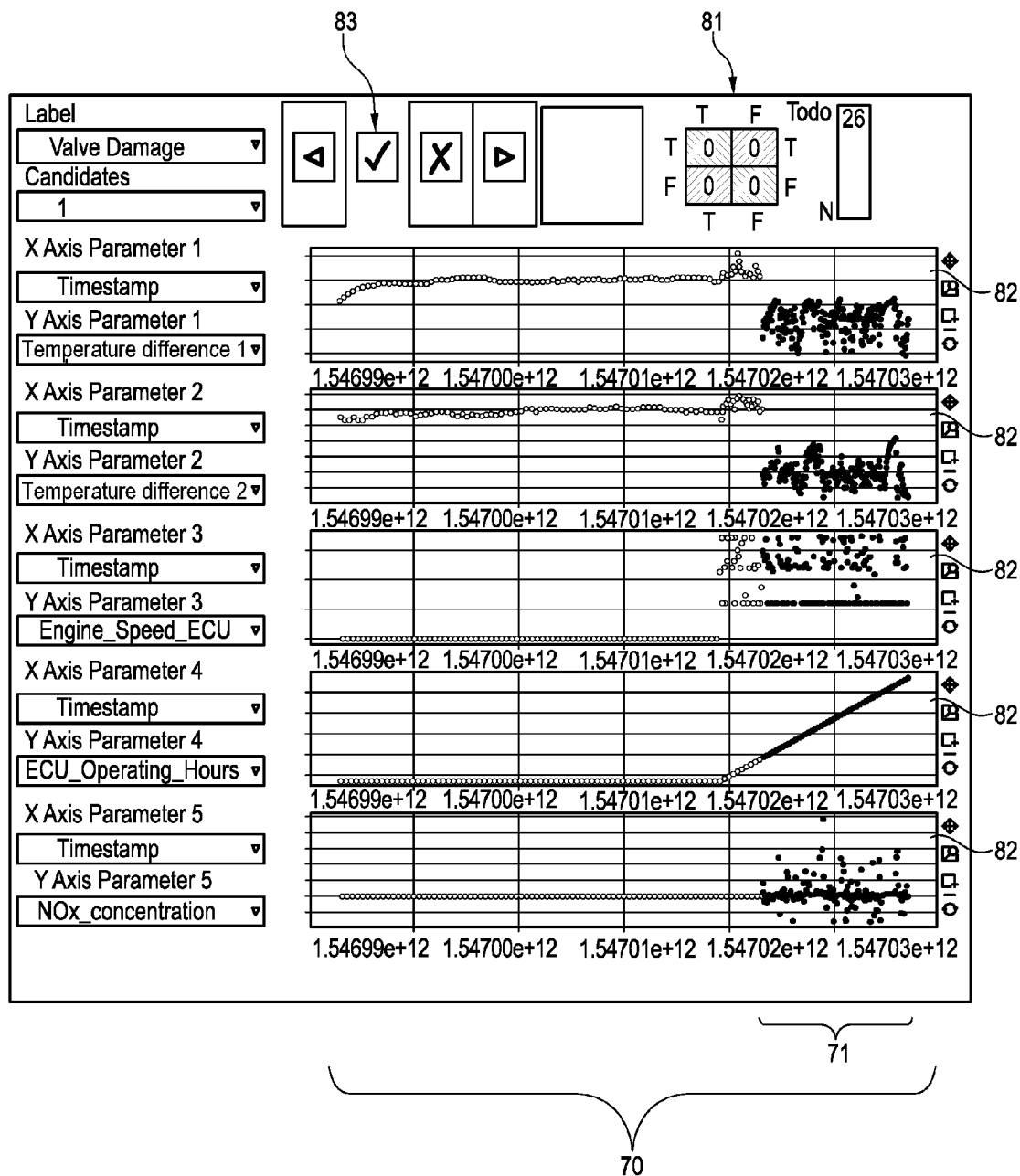
FIGS. 9 to 11 show different views of an interface of the system according to FIG. 3.

FIG. 9 shows an interface 81 in the form of a GUI. The interface 81 is e.g. displayable in a browser. The interface 81 comprises multiple display sections 82 (five display sections 82 in the example shown, an interface 81 with only one or generally with more than one display section 82 also being conceivable) and a classification section 83. In the example shown, the classification section 83 is shown in a configuration that provides two alternative input options (in the present case accordingly "yes/no"). Optionally, multiple classes or characteristic quantities (e.g. 0 to 100) may also be selectable, e.g. displayed and usable in the form of a controller.

Each display section 82 shows captured measurement data, obtained by means of one or more measuring devices, against the time axis (in the same time window). In the example shown, a selection option is provided next to each display section 82, by means of which the respective X-axis parameter and the respective Y-axis parameter of the display section 82 can be selected. According to FIG. 9, the parameters corresponding to FIG. 5 are set for the first display section 82 from the top and the parameters corresponding to FIG. 6 are set for the second display section 82 from the top. The further display sections 82 show a measured number of revolutions, an operating time ascertained by means of a time measurement and a nitrogen oxide concentration, in each case against time. Alternatively, a measured value can also be plotted against a measured value other than time, e.g. as shown in FIG. 8.

A user has already selected a selected portion 71 of the measurement data 70 because said portion appeared eye-catching with regard to possible damage to the machine, for example damage to a specific component of the machine (e.g. damage to a valve, e.g. an exhaust valve of an internal combustion engine).

After the selected portion 71 has been selected, the classification section 83 is activated. As soon as the classification section 83 has been activated, the user can enter a classification. In the example shown, the user would enter that there is probably damage, which can be seen from the selected portion 71 of the measurement data 70.

Figure 10:
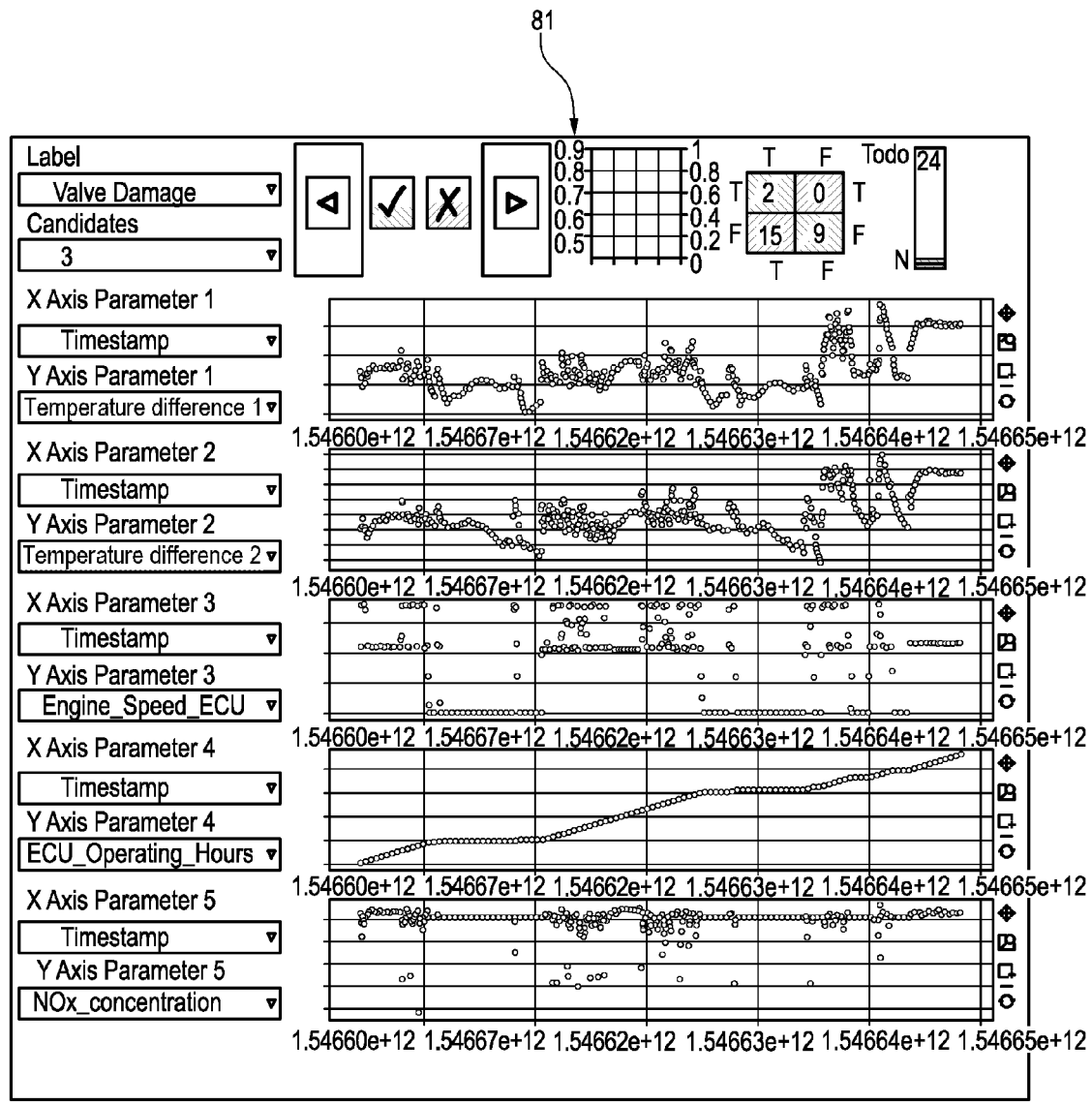

FIG. 10 shows the interface 81 with a further candidate with further measurement data (e.g. from another machine, in particular of the same type, e.g. another jet or engine, e.g. gas turbine engine). No selected portion 71 has been selected thus far. Because classifications of previous candidates have already been made, the applicable machine learning model 51 has already been able to be trained and therefore already provides an estimate, according to which it is more likely in the case shown that no damage is discernible in the measurement data that are now presented.

Optionally, the probabilities for positive, false positive, negative and false negative are calculated and e.g. specified in a matrix, e.g. in the form of a so-called "confusion matrix".

Figure 11:
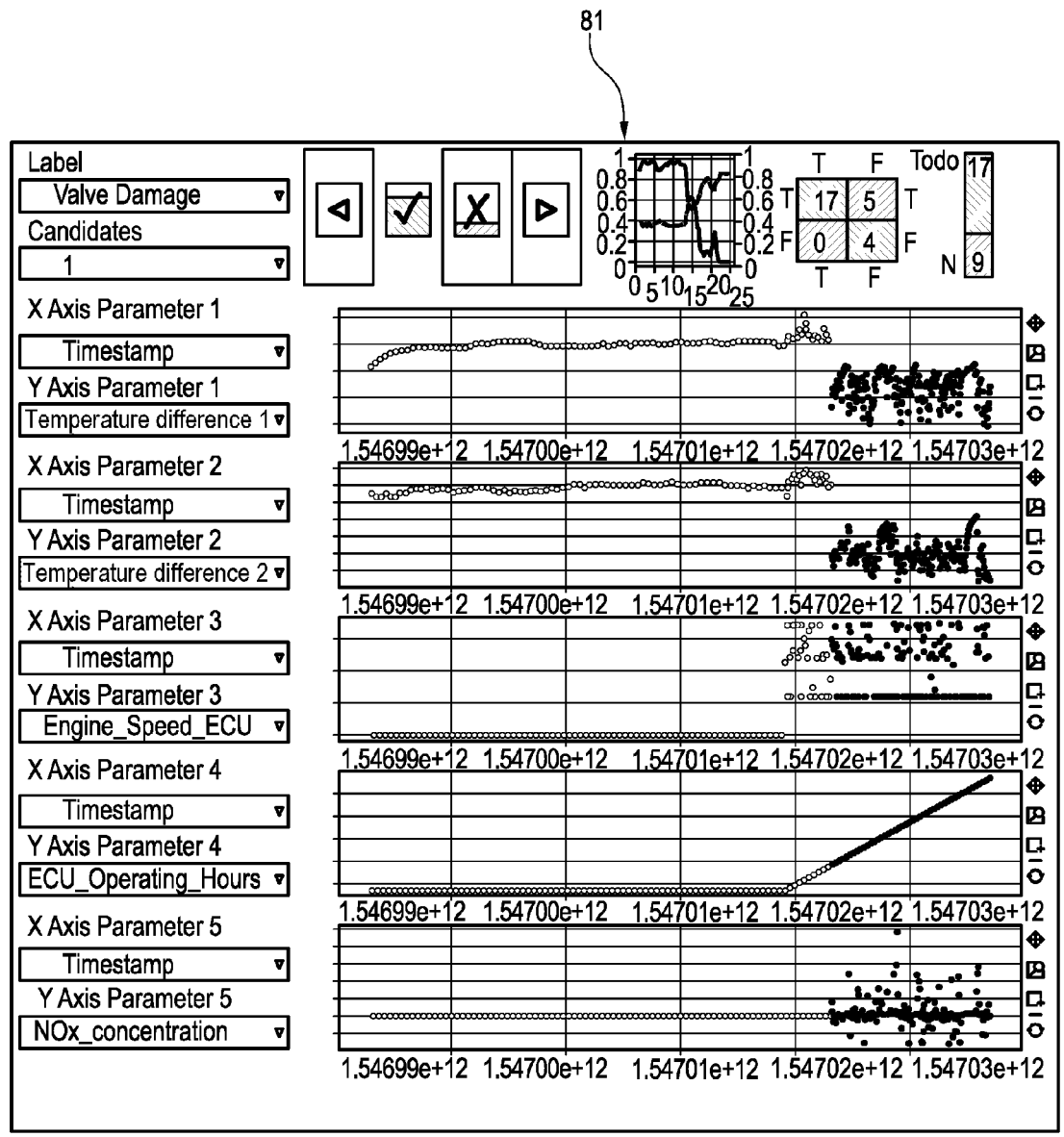

FIG. 11 shows a state in which an adequate set of candidates has been classified by the user (or by other means). By way of illustration, the first candidate is displayed again in this case and the machine learning model 51 is now already so well trained that it indicates damage with a significantly higher probability than no damage (e.g. valve damage).

A graph next to the classification section 83 shows, as a response versus the number of classified candidates, an overall upward trend indicating the accuracy of the prediction and an overall downward trend indicating the error of the prediction. Based on around 25 candidates here by way of illustration, the accuracy is already over 80%, the error being well below 0.1.

As soon as the user selects a selected portion 71, the machine learning model 51 calculates the applicable probabilities with regard to this selected portion 71.

The classification of the adequate set of candidates is possible within a few minutes and permits a machine learning model 51 to be trained with a prediction that is surprisingly precise with regard to many applications. The classification is performed multiple times by different users, with the result that multiple trained machine learning models 51 are provided. These can provide varying qualities of predictions as a result of different classifications from the users. E.g. the best machine learning model 51 can be selected. The precision can be significantly improved again by calculating the higher-level machine learning model 57. The quality of the prediction models can be ascertained either on the basis of a ground truth or optionally, if the ground truth is not available, by an expert, and/or optionally on a purely data-driven basis by means of a comparison with the majority of the prediction models.

FIG. 12 shows a method for classifying measurement data, comprising the following steps:

Step S1: Provision of a trained higher-level machine learning model 57.

For this purpose, e.g. a method for training the machine learning models 51 is performed, comprising steps S10 to S14:

Step S10: Capture, by the one or more computers 52, of measurement data 70 obtained by means of one or more measuring devices 60-62, the measurement data 70 being captured in particular in the form of time series data and in particular indicating measurement values from one or more gas turbines 10. When the measurement data 70 obtained by means of the one or more measuring devices 60-62 are captured, the measurement data 70 are optionally selected from a multiplicity of measurement data, wherein a prediction of the further machine learning model 56 is used for the selection.

Step S11 (optional): Provision, by means of the one or more computers 52, of the measurement data 70 on the interface 81, wherein measurement data 70 from multiple measuring devices 60-62 are provided on the interface 81 in particular at the same time.

Step S12: Reception, by the one or more computers 52, of classification data units relating to the measurement data 70, the classification data units received by the one or more computers 52 optionally relating to the measurement data 70 provided on the interface 81.

Step S13: Reception, by the one or more computers 52 and for each of the classification data units, of a selected portion 71 of the measurement data 70.

Step S14: Training, by means of the one or more computers 52, of multiple machine learning models 51 on the basis of the classification data units and the selected portions 71 of the measurement data 70, the machine learning models 51 comprising e.g. an artificial neural network. The machine learning models 51 can be trained e.g. after each provision of classification data or can be trained with classification data units relating to different measurement data 70 and associated selected portions 71 of measurement data 70 as soon as a predetermined number of classification data units has been provided.

Steps S10 to S14 are optionally performed repeatedly for different (candidates of) measurement data 70, as a result of which the accuracy of the prediction of the trained machine learning models 51 can be improved further.

Multiple machine learning models 51, e.g. multiple instances of the same type of machine learning model 51, are trained (e.g. by virtue of each of the above steps being performed by multiple users) and a higher-level machine learning model 57 is calculated from the multiple machine learning models 51 (instances), the individual instances of the machine learning model 51 for calculating the higher-level machine learning model 57 being weighted e.g. with different weighting factors. The weighting factors are determined in particular by ascertaining a prediction accuracy for each of the machine learning models 51 on the basis of a validation dataset.

Step S2 comprises the classification, by the one or more computers 52, of measurement data 70 captured by means of the one or more measuring devices 60-62, by using the higher-level machine learning model 57.

The optional step S3 comprises generation, by the one or more computers 52 and on the basis of the classification of the measurement data 70, of a dataset that indicates performance of maintenance work.

Figure 13:
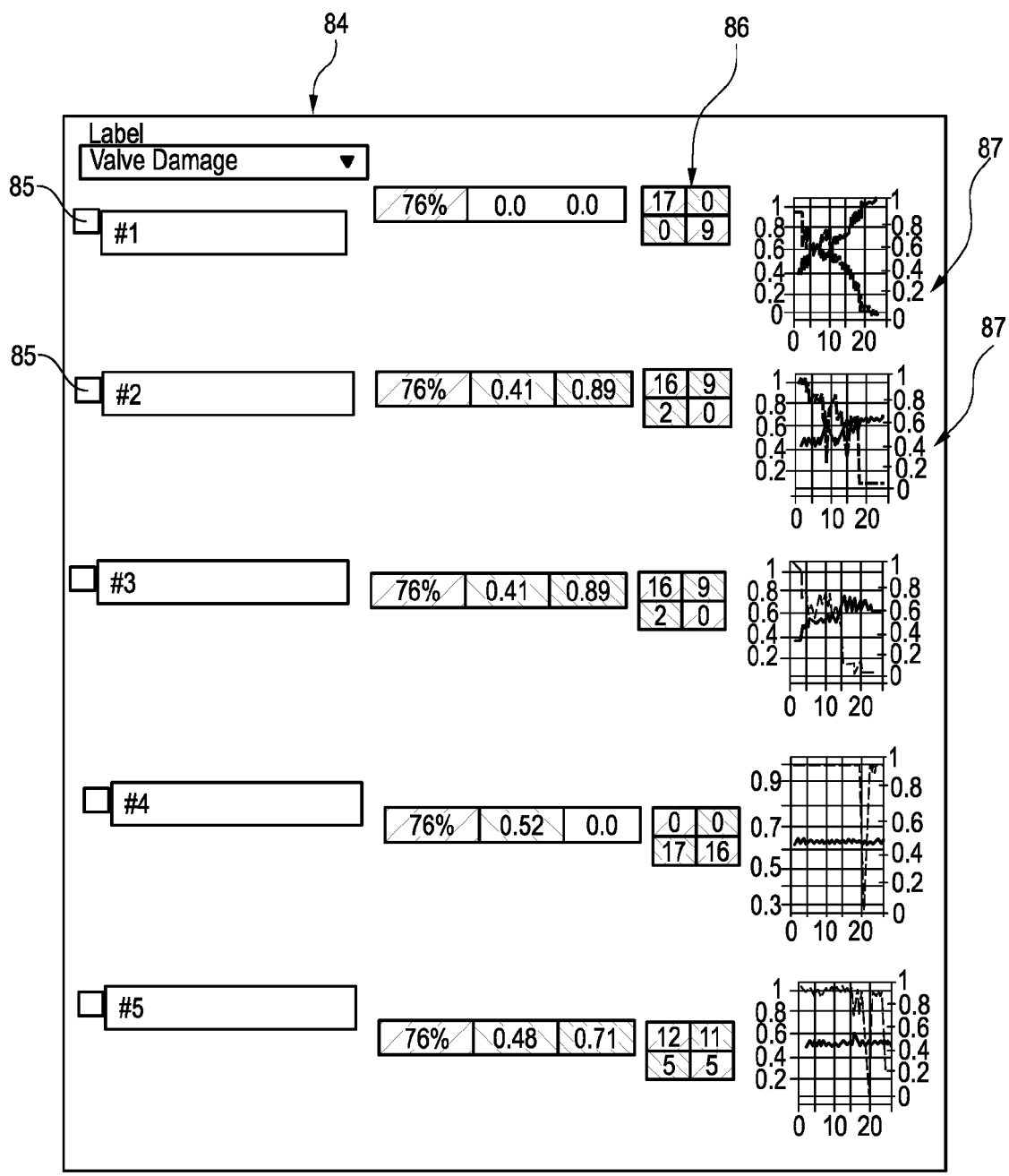
FIG. 13 shows an interface of the system according to FIG. 3.

FIG. 13 shows the interface 84 already mentioned. The interface 84 shows the performance of multiple machine learning models 51 (five here by way of illustration) that have been trained differently, namely by different users. For this purpose, the interface 84 displays a matrix 86 in the form of a "confusion matrix" and a graph 87 that indicates the trend in the prediction accuracy and the error in the manner described above. The interface 84 also displays additional details, such as e.g. the proportion of data that have already been classified and a weighting factor calculated e.g. on the basis of the prediction accuracy. The weighting factors are e.g. each a real number between 0 and 1.

The interface 84 comprises multiple selection sections 85, in the present case each in the form of a checkbox. A user can use the selection sections to specify which of the machine learning models 51 (more precisely, the parameters of which of the machine learning models 51) are to be included in the calculation of the higher-level machine learning model 57. The higher-level machine learning model 57 then serves as the "gold standard" for the classification of further data.

Figure 14:
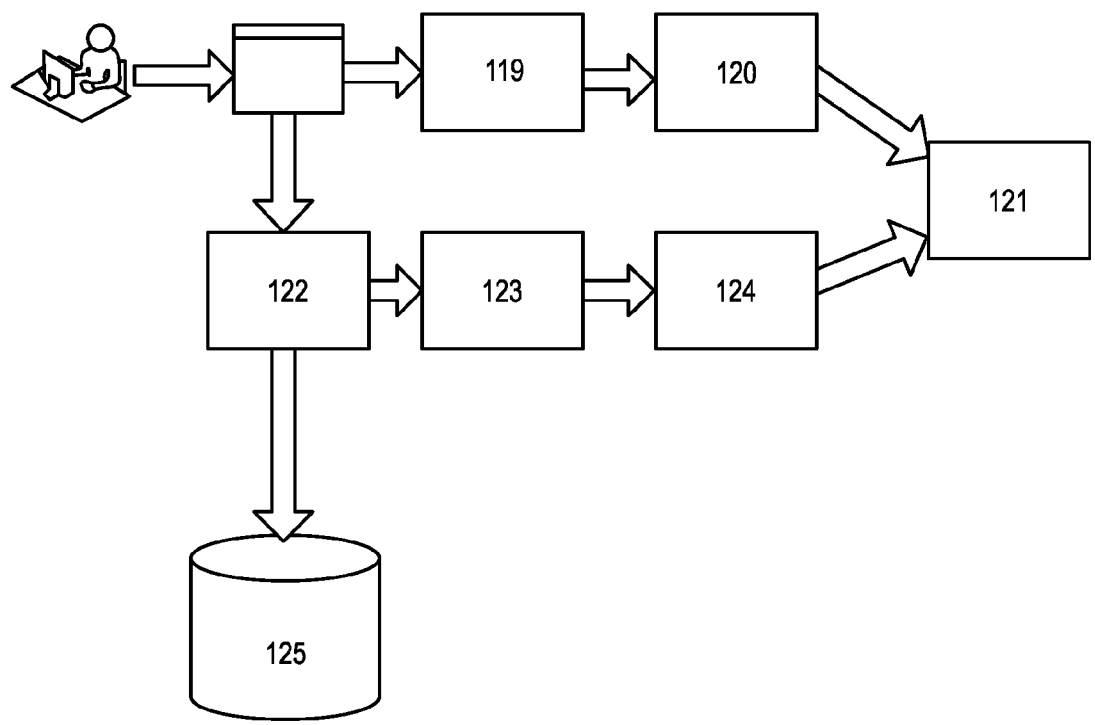
FIG. 14 shows details of the system according to FIG. 3.

FIG. 14 shows details of a creation of the higher-level machine learning model 57. A set of features is generated for each user on the basis of the at least one selected portion 71 of data, block 119. Based on this, a classification performance is ascertained with regard to these data, block 120. In parallel, reference data are extracted, block 122, optionally stored in a database 125, and a set of features of the reference data is generated, block 123. A classification performance is also ascertained with regard to the reference data, block 124. Based on the classification performances, a weighting factor is ascertained, block 121. In this way, it is possible to ascertain how precisely a user has selected features for recognizing a signature, e.g. an anomaly in the data.

The probability of correctly positive recognition is then ascertained for each potential signature (e.g. anomaly) in the data using each machine learning model 51. These probabilities are weighted with the weighting factors in order to ascertain the probability of the higher-level machine learning model 57. If this probability exceeds a specific value, e.g. 0.5, the signature is classified as a positive result, e.g. as a detected anomaly.

It will be understood that the invention is not limited to the embodiments described above, and various modifications and improvements can be made without departing from the concepts described herein. Any of the features may be used separately or in combination with any other features, unless they are mutually exclusive, and the disclosure extends to and includes all combinations and subcombinations of one or more features which are described here.

In particular, it should be noted that instead of the gas turbine engine 10, another machine, in particular a motor and/or engine in general, e.g. a piston engine, can also be used.

LIST OF REFERENCE SIGNS

8 Aircraft
9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
30 Gear box
50 System for training a machine learning model
51 Machine Learning Model
52 Computer
53 Memory 54 Instructions
55 Processor
56 Machine learning model (selection model)
57 Higher-level machine learning model
60-62 Measuring device
70 Data (measurement data)
71 Selected portion
80 Display
81 Interface
82 Display section
83 Classification section
84 Interface
85 Selection section
86 Matrix
87 Graph
100-110, 125 Database
111-124 Block
A Core air flow
B Bypass air flow

The invention claimed is:

1. A method for training machine learning models, comprising:
capturing, by one or more computers, of data obtained by one or more measuring devices, each being a sensor for measuring a physical quantity as time series data;
receiving, by the one or more computers, multiple classification data units relating to the data;
receiving, by the one or more computers and for each classification data unit, a selected portion of the data; and
training, by the one or more computers, multiple machine learning models, each on a basis of at least one of the classification data units and the applicable selected portion of the data, wherein the multiple machine learning models are multiple instances of a same machine learning model;
wherein the data indicates measured values from one or more engines;
wherein the selected portion of the data is provided by a selection by one or more users via one or more interfaces.

2. The method as claimed in claim 1, wherein properties of each selected portion of the data are extracted as parameters and the training of each of the multiple machine learning models is performed on the basis of the parameters.

3. The method as claimed in claim 1, further comprising:
repeated provision, by the one or more computers, of the data on at least one interface for display to multiple users.

4. The method as claimed in claim 1, wherein the one or more engines are one or more gas turbines or one or more piston engines.

5. The method as claimed in claim 1, wherein a prediction accuracy is ascertained for each of the machine learning models.

6. The method as claimed in claim 5, wherein each of the prediction accuracies are displayed on an interface.

7. The method as claimed in claim 6, wherein one or more of the machine learning models are selected by way of the interface.

8. The method as claimed in claim 1, wherein a higher-level machine learning model is calculated from parameters of the multiple machine learning models.

9. The method as claimed in claim 8, wherein the individual machine learning models are weighted with different weighting factors to calculate the higher-level machine learning model.

10. The method as claimed in claim 9,
wherein a prediction accuracy is ascertained for each of the machine learning models;
wherein the weighting factors are determined based on the prediction accuracies.

11. A method for classifying data, comprising:
providing the higher-level machine learning model as claimed in claim 8;
classifying, by the one or more computers, data captured by the one or more measuring devices and/or at least one input device, by using the higher-level machine learning model.

12. The method as claimed in claim 11, further comprising:
generating, by the one or more computers and on a basis of classification of the data and/or the at least one input command, a dataset that indicates performance of maintenance work.

13. A computer program product comprising instructions that, when executed by one or more processors, cause the one or more processors to perform the following steps:
capturing data obtained by one or more measuring devices, each being a sensor for measuring a physical quantity as time series data;
receiving multiple classification data units relating to the data;
receiving a selected portion of the data for each of the classification data units; and
training multiple machine learning models, each on a basis of at least one of the classification data units and the applicable selected portion of the data, wherein the multiple machine learning models are multiple instances of a same machine learning model;
wherein the data indicates measured values from one or more engines;
wherein the selected portion of the data is provided by a selection by one or more users via one or more interfaces.

14. A machine learning model using the method as claimed in claim 8.

15. A system for training machine learning models, the system comprising one or more processors and a memory that stores instructions that, when executed by the one or more processors, cause the one or more processors to perform the following steps:
capture data obtained by one or more measuring devices, each being a sensor for measuring a physical quantity as time series data;
receive multiple classification data units relating to the data;
receive a selected portion of the data for each of the classification data units; and
train multiple machine learning models, each on a basis of at least one of the classification data units and the applicable selected portion of the data, wherein the multiple machine learning models are multiple instances of a same machine learning model;
wherein the data indicates measured values from one or more engines;
wherein the selected portion of the data is provided by a selection by one or more users via one or more interfaces.

16. The system as claimed in claim 15, wherein the one or more engines are one or more gas turbines or one or more piston engines.

17. The computer program product as claimed in claim 13, wherein the one or more engines are one or more gas turbines or one or more piston engines.

\* \* \* \* \*